US006346049B1

United States Patent
Edi

(10) Patent No.: US 6,346,049 B1
(45) Date of Patent: Feb. 12, 2002

(54) TRANSMISSION AND TORQUE-LIMITING JOINT ABLE TO ENGAGE THE DRIVING AND DRIVEN MEMBERS ALWAYS IN A SINGLE ANGULAR POSITION

(76) Inventor: Bondioli Edi, Via Gina Bianchi 18 - 46029 Suzzara, Mantova (IT)

( * ) Notice: Subject to any disclaimer, the term of this patent is extended or adjusted under 35 U.S.C. 154(b) by 0 days.

(21) Appl. No.: 09/627,764

(22) Filed: Jul. 28, 2000

(30) Foreign Application Priority Data

Jul. 29, 1999 (IT) .......................................... FI99A0173

(51) Int. Cl.[7] .............................................. F16D 7/04
(52) U.S. Cl. ........................................................ 464/38
(58) Field of Search ........................... 464/1–6, 37, 38, 464/39; 192/56.5

(56) References Cited

U.S. PATENT DOCUMENTS

| 2,514,227 | A | * | 7/1950 | Dodge .................... 192/56.5 X |
| 2,960,852 | A | * | 11/1960 | Schroter et al. .......... 464/37 X |
| 3,889,491 | A | * | 6/1975 | Wanner et al. ............. 464/39 X |
| 4,311,224 | A | * | 1/1982 | Kato et al. .................. 192/56.5 |
| 5,706,922 | A | | 1/1998 | Bondioli |
| 5,733,196 | A | | 3/1998 | Nienhaus |
| 6,174,238 | B1 | * | 1/2001 | Bondioli ...................... 464/37 |

FOREIGN PATENT DOCUMENTS

| DE | 30 01 566 A1 | 7/1981 |
| EP | 0 733 820 B1 | 3/1996 |
| EP | 0 733 820 A1 | 9/1996 |
| FR | 1211947 | 3/1960 |
| IT | 1278633 | 3/1995 |
| IT | 1286702 | 8/1996 |
| WO | WO 98/06959 | 2/1998 |

* cited by examiner

Primary Examiner—Lynne H. Browne
Assistant Examiner—Greg Binda
(74) Attorney, Agent, or Firm—McGlew and Tuttle, P.C.

(57) ABSTRACT

The substantially radial glide seats (18) for the sliders (20) in the inner member (3) are disposed at mutually different angles ($\alpha$, $\beta$, $\gamma$), and the recesses (5) are correspondingly provided in the outer member (1); to stress the sliders (20) in the centrifugal direction, two symmetrical discoidal elements (14) are provided on whose facing surfaces shaped portions (14B, 14E) are tangentially machined which are able to cooperate with corresponding inner profiles (20B) of sliders (20), while springs (11) stress the two discoidal elements (14) toward one another; the discoidal elements (14) are elastically brought into contact with one another only when the two members (1, 3) of the joint are located in the unique reciprocal angular position in which one respective single recess (5) corresponds to each slider (20).

6 Claims, 9 Drawing Sheets

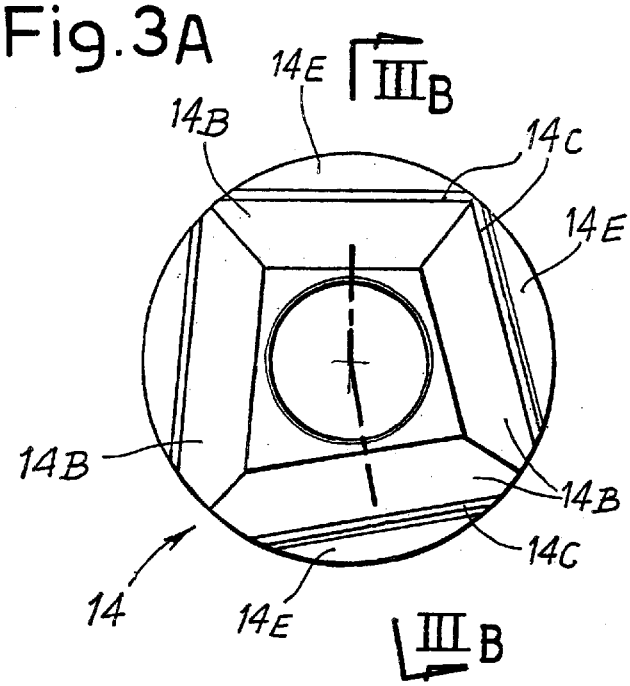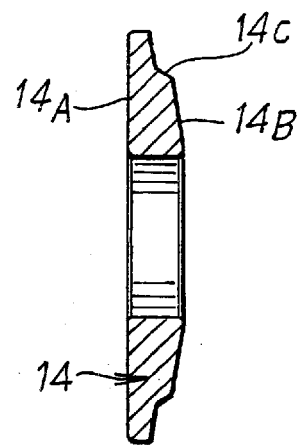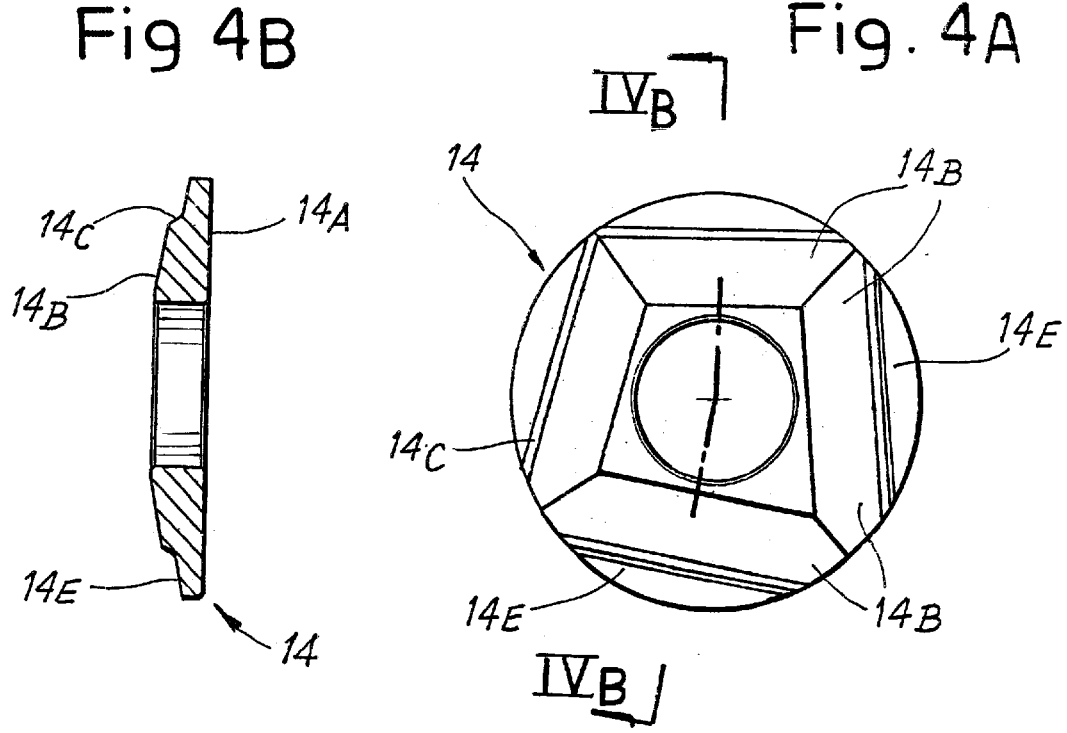

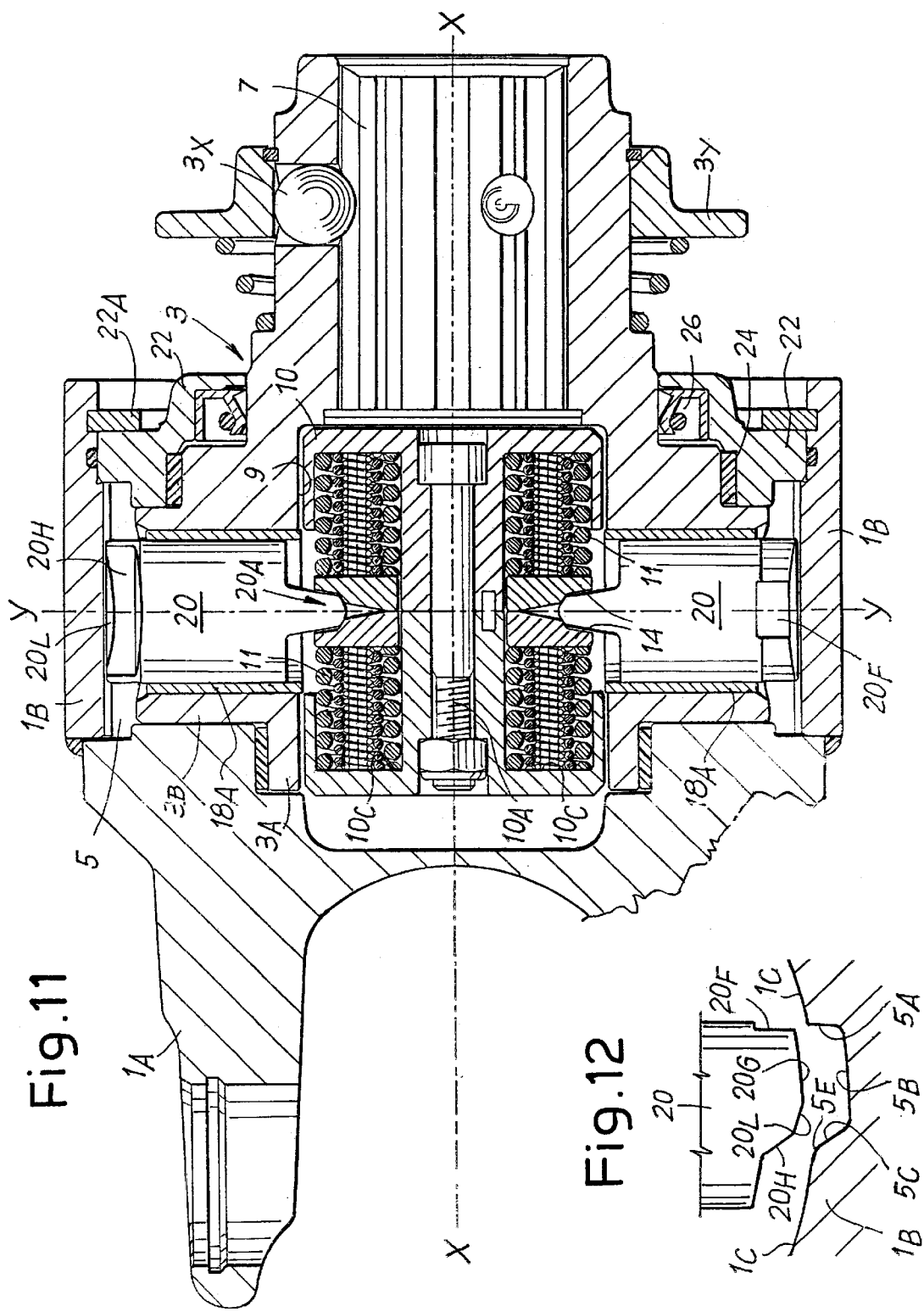

TRANSMISSION AND TORQUE-LIMITING JOINT ABLE TO ENGAGE THE DRIVING AND DRIVEN MEMBERS ALWAYS IN A SINGLE ANGULAR POSITION

BACKGROUND OF THE INVENTION

Italian Patent 1 278 633, European Patent 0 733 820 and U.S. Pat. No. 5,706,922 have disclosed a transmission and torque-limiting joint able to disengage the driven member from the driving member upon exceeding a maximum value of the transmitted torque and to allow recoupling at a lesser value of the relative velocity; one of the two members is outer and the other inner. Provided on the inner surface of the outer member are receptive recesses and in the inner member at least two tangential seats, each extending orthogonally to a radial direction and lying parallel in a plane orthogonal to the axis of a rotation of the joint; in correspondence with each of said tangential seats, a radial glide seat is provided, extending between the periphery of said inner member and the tangential seat; in each of said tangential seats two opposing gliding pads elastically stressed toward one another and having opposing surfaces with receptive symmetrical shapings are provided; in said radial glide seat a slider with a wedge-shaped inner profile is accommodated, able to glide centripetally and to penetrate between the two pads, thus parting them, and with a shaped outer profile able to cooperate with one or other of said receptive recesses of the outer member, so as to transmit a torque between said two members, inner and outer, and to generate a centripetal radial thrust on the wedge-shaped element, which thrust increases with the increase in the transmitted torque until it causes the separation of the two pads with the aid of the wedge-shaped profile of the slider and the centripetal movement of said slider until it frees the latter from the recess in which it was captive. The reverse movements of the sliders, with the aid of the elastic urgings on the pads, are obtained after a reduction in the relative velocity between said two members, driving and driven.

A joint as defined above can engage a in plurality of different angular positions.

In order to obtain coupling in a single angular position, Italian Patent 1 286 703 and International patent WO98/06959 have disclosed a particular solution which provides, in each of said receptive recesses, at least one peg flush with the inner surface of said outer member; furthermore, in each of said plate-like sliders at least one transverse through notch is machined, each notch being sized so as to accommodate one of said pegs. The arrangement of the peg or pegs in each of the various recesses is different from that in the other recesses and corresponds to the arrangement of the notch or notches of one of the sliders only. With these combinations, each slider can penetrate only in the corresponding recess and continues past the other recesses, sliding over their peg or pegs; thus coupling occurs only in one unique reciprocal angular position between the two members of the joint and takes place simultaneously with all sliders in the corresponding recesses.

In the solutions mentioned above, the radial coupling sliders or plugs become damaged and worn - under disengagement conditions because of the very frequent passing of the sliders in front of the recesses, and the continuous elastic stressing of the sliders toward coupling, owing to the action of the springs which act upon each of them.

SUMMARY AND OBJECTS OF THE INVENTION

The present invention solves both the problems of coupling in a single analogous position and the problem of reducing the wear on the elements of the joint, in a particularly simple, reliable and economical manner. These and other objects and advantages will become apparent from the text which follow.

The invention relates to a transmission and torque-limiting joint of the abovementioned type.

According to the invention, said joint possesses substantially the following features:

said substantially radial glide seats in the inner member are disposed at mutually different angles and said recesses being correspondingly arranged in the outer member;

and the elastic means able to urge said sliders in the centrifugal direction comprise two symmetrical discoidal elements, on whose facing surfaces shaped portions are tangentially machined which are able to cooperate with corresponding inner profiles of said sliders, springs being provided capable of stressing said two discoidal elements toward one another.

With this arrangement, said discoidal elements remain spaced apart from one another by the inner profiles of at least two of said sliders, as a result of which the other sliders can move radially in the centrifugal direction without elastic stressings; said discoidal elements, however, are elastically brought into contact with one another only when the two members, driving and driven, of the joint are located in the unique reciprocal angular position in which one recess corresponds to each slider; in this reciprocal angular position, and only in this reciprocal angular position, all the sliders are elastically urged into the respective recesses of the outer member, as a result of which the transmission coupling between positions, the sliders are either retained between the two discoidal elements in an attitude in which they are sheltered in the respective radial glide seats or freely movable in the glide seats and subjected to virtually no damage as a result of the relative angular movement between the two members of the joint, apart from a possible weak centrifugal stressing caused by their own weight.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 3A, 3B and 4A, 4B show two discoidal elements in isolation, viewed end-on and in section according to IIIB—IIIB and IVB—IVB in FIGS. 3A and 4A respectively, the latter showing the faces that are opposed during assembly;

FIG. 11 shows the joint in a state of coupling, in a section through the broken line XI—XI in FIG. 2; and FIG. 12 shows an exploded view of the cooperating profiles of a recess and a slider, which perform the coupling between the driving and driven members.

DESCRIPTION OF THE PREFERRED EMBODIMENTS

According to what is depicted, the joint or coupling comprises over the same plane, transverse to the axis of rotation X—X—at least four or more coupling units, radially oriented and mutually spaced at mutually different angles α, β, γ having, for example, the values of 75°, 95° and 105°.

Figure 2:
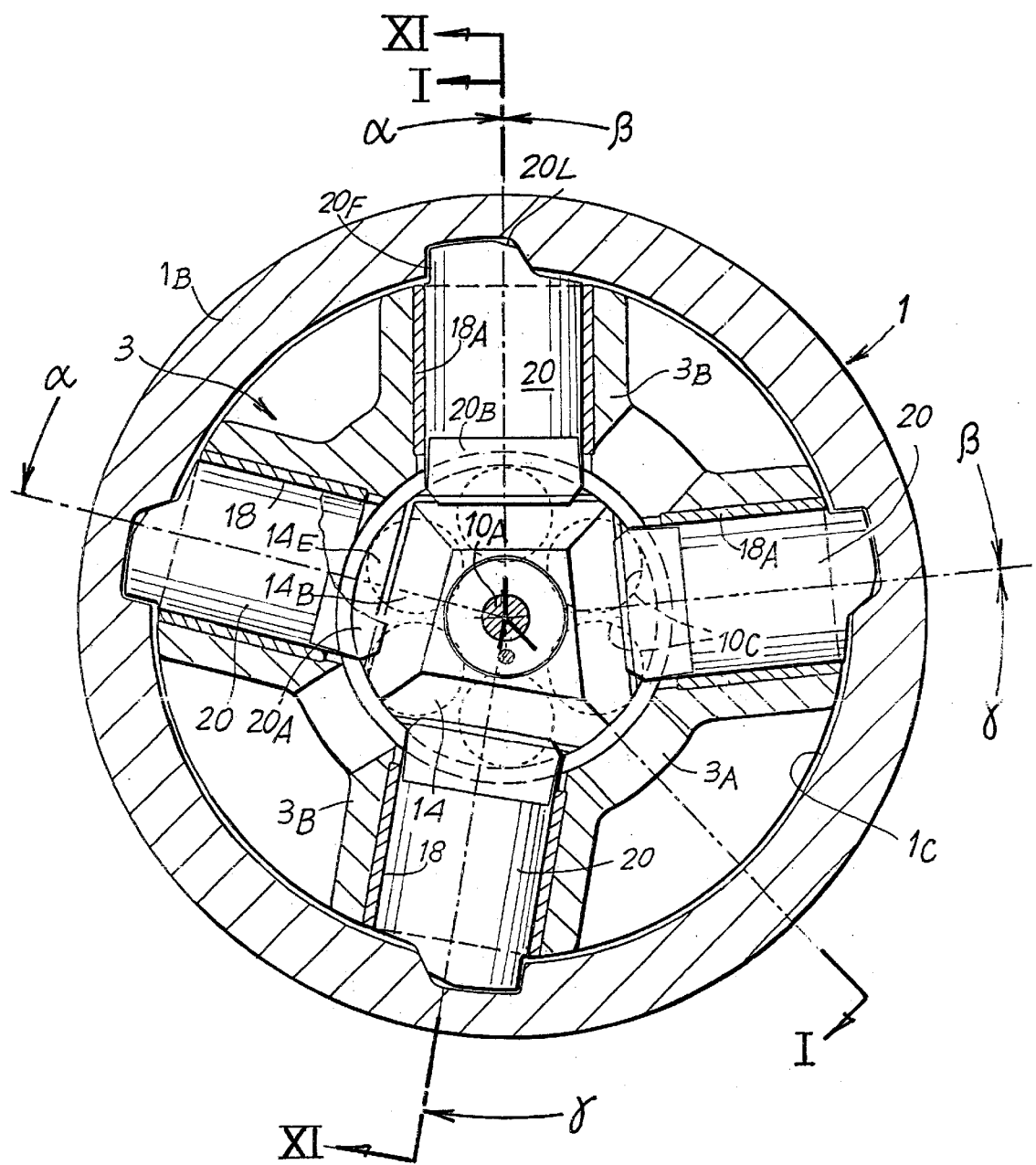
FIG. 2 shows a cross section along II—II (and Y—Y) in FIG. 1, in the conditions of coupling between the driving and driven members.
Figure 5C:
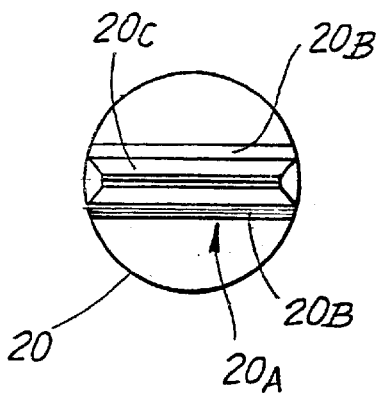
FIGS. 5A, 5B, 5C, 5D show in isolation a cylindrical slider in different geometrical views.
Figure 5A:
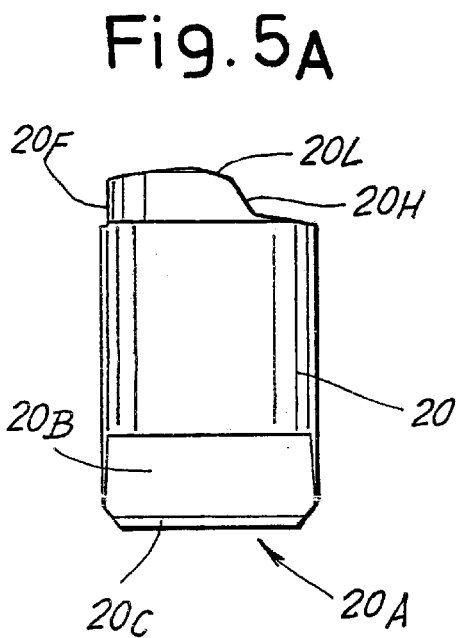
Figure 5B:
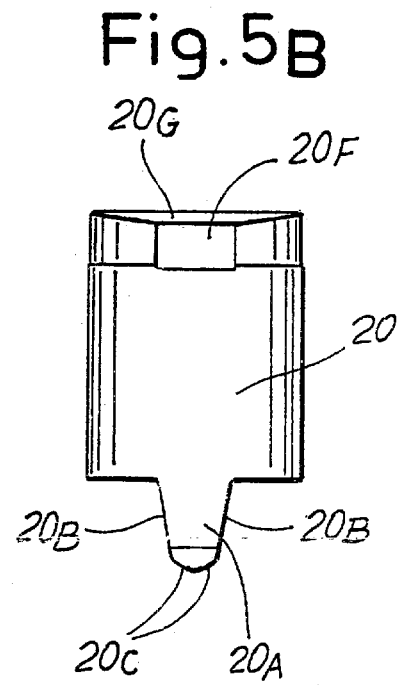
Figure 5D:
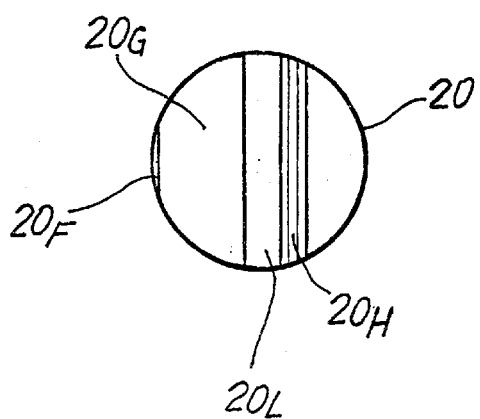

1 designates generically an outer member and 3 an inner member, one of the two members being driving and the other driven. In the drawing, the outer member 1 is a forked element with a fork 1A, for example of an articulated shaft and in particular of a cardan shaft; a skirt 1B is welded to the fork 1A and constitutes the outer part surrounding the inner member 3; this skirt 1B has, in particular, an inner surface 1C in the shape of a circular cylinder. Four recesses S, mutually spaced angularly at the abovementioned angles, extend from said inner surface 1C of the outer member 1; each of said recesses exhibits (see FIGS. 2, 10, 12) a first flank 5A of substantially radial extent, a bottom 5B having an extent corresponding to that of the inner surface 1C of the skirt 1B, a second flank 5C inclined with respect to a radical direction, and a junction 5E between the second flank 5C and said inner surface 1C of the skirt 1B of the outer member 1.

The inner member 3 has a core 3A and an axial appendix 3S with an axial hole 7 which has longitudinal grooved profiles to allow rapid coupling or disengagement with a grooved shaft, with spring-loaded ball-type 3X and ring-type 3Y retaining means or other equivalent retaining means which are known per se in the art. The core 3A has four projections 3B which are angularly distributed in the same way as the recesses 5 and are externally delimited by portions of cylindrical surfaces substantially corresponding to those of the inner surface 1C of the skirt 1B of the outer member 1. An axial seat 9 is formed—as a continuation of the hole 7—in the core 3A and may be a cylindrical seat or other seat with its axis coinciding with the axis X—X of rotation of the joint formed by the two members 1 and 3. The seat 9 glidingly accommodates two reaction elements 10 which are symmetrical and opposite to one another; a connecting bolt 10A passes through axial expansions 10E of the two reaction elements 10 and couples them. The opposing faces 10B of the two reaction elements 10 possess a plurality of seats having a cylindrical blind hole 10C (six in the drawing), in each of which a set of helical springs 11 is accommodated. Two symmetrical discoidal elements 14 which are generally symmetrical (apart from the shaped portions machined thereon) are glidingly fitted onto the axial expansions 10E of the two reaction elements; said discoidal elements are shown in particular in FIGS. 3A, 3B, 4A, 4B and will be described in more detail below as to their morphology and function. The two discoidal elements 14 are elastically stressed against one another by the sets of springs 11 which act upon them, reacting on the bottom of the seats 10C recessed into the reaction elements 10. Said discoidal elements 14 can move axially along the axial expansions 10E which guide them to glide into contact with the central holes of said discoidal elements 14, although said elements are nevertheless already centered by the combined action of the sliders thereupon.

The faces 14A of the two discoidal elements 14—which are outer faces in the assembly of the two elements in a symmetrical attitude relative to the drawn plane Y—Y orthogonal to the axis X—X of rotation—are flat and the sets of springs 11 act thereupon. Each of the opposing and mutually facing surfaces of the two discoidal elements 14 typically possesses four shaped portions having flat surfaces which extend—in the frontal view (FIGS. 3A, 4A)—orthogonal to the directions of the angles α, β and γ; each of the four shaped portions possesses, in particular, a first, more inward inclined flat surface 14B, a junction 14C and a second, outward inclined flat surface 14E, extended approximately as a circular segment to a base. The straight lines delimiting said surfaces 14B, 14C, 14E are differently inclined, being—in the frontal view (FIGS. 3A, 4A) orthogonal to the radial lines of the angles α, β, γ.

Each of the projections 3B of the core 3A of the inner member 3 exhibits a cylindrical radial glide seat 18 equipped with a tubular sleeve 18A designed to reduce friction. The four glide seats 18 are mutually angulary spaced at angles α, β, γ(which are mutually different). A slider 20 glides in a radial direction in each radial glide seat 18 (see also FIGS. 5A, 5B, 5C, 5D, 7 and 8), and has a cylindrical shape with both bases shaped. The inner base exhibits a wedge-shaped profile generally designated by 20A having planar surfaces parallel to a diameter. This inner profile exhibits two opposite surfaces 20B with a dihedral of lesser aperture, two receptive opposite end surfaces 20C with a dihedral of greater aperture and defining the edge of the wedge, which is moreover rounded.

The surfaces 20B of the sliders 20 are inclined correspondingly to the surfaces 14B and 14E of the discoidal elements 14; therefore, after assembly, the surfaces 20B of each slider 20 are parallel to the surfaces 14B and 14E of the corresponding shaped portions recessed in the facing surfaces of the two discoidal elements 14.

Each slider 20 exhibits (see especially FIGS. 5A to 5D) an outer profile shaped substantially correspondingly with that of the recesses 5 and in particular the outer shaped portion exhibits a first substantially radial flat surface 20F which corresponds with the first flank 5A of the recess 5, an end surface 20G which extends substantially in a manner corresponding to the extent of the bottom 5B and of the surface 1C, a second flank 20H inclined substantially like the second flank 5C of the recess 5, and a junction 20L which extends between a said end surface 20G and said second flank 20H and which has an orientation substantially corresponding to that of said junction 5E of the recesses 5.

Figure 1:
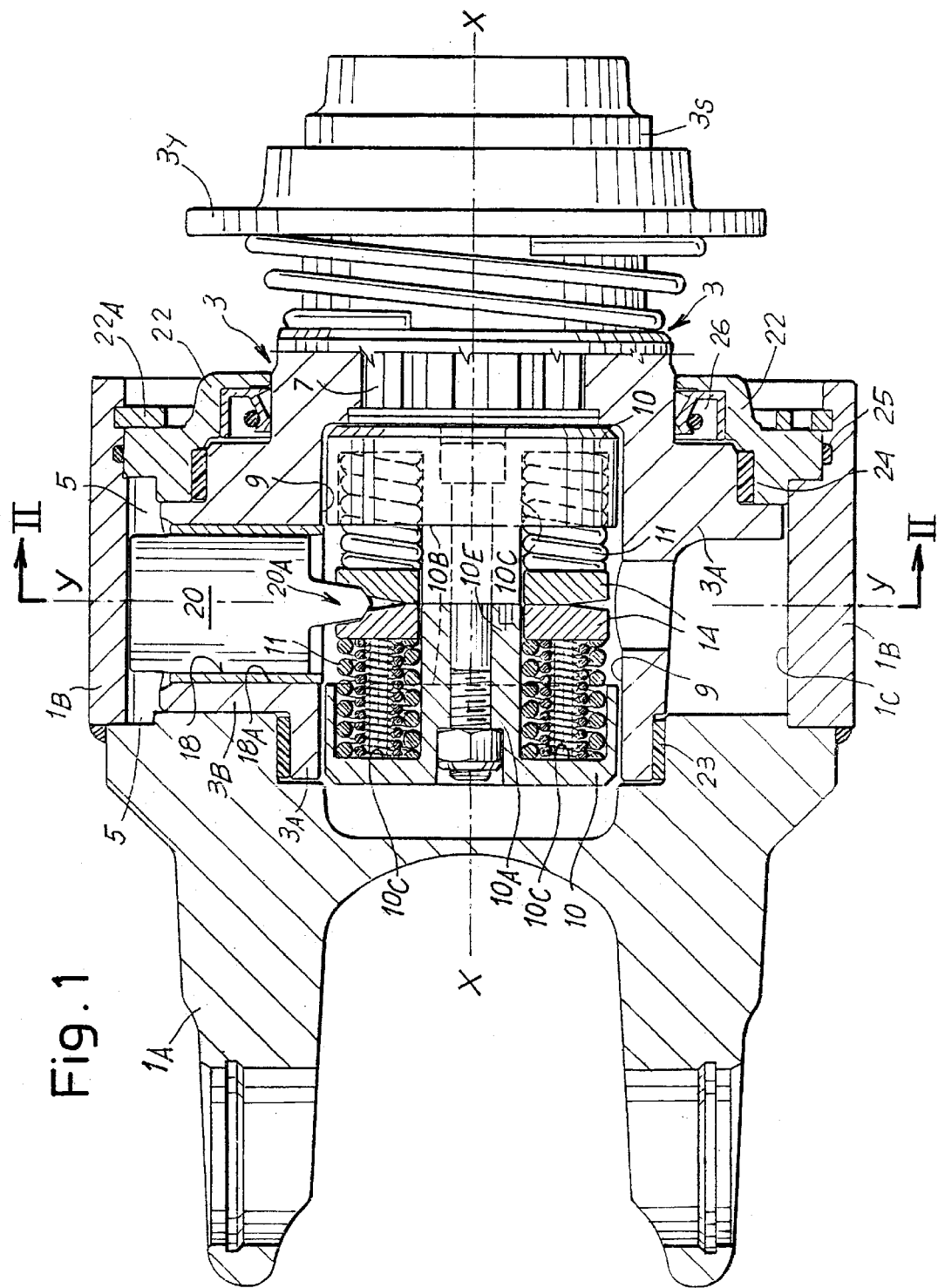
FIG. 1 shows the engaged joint in a longitudinal section along the broken line I—I in FIG. 2.
Figure 6:
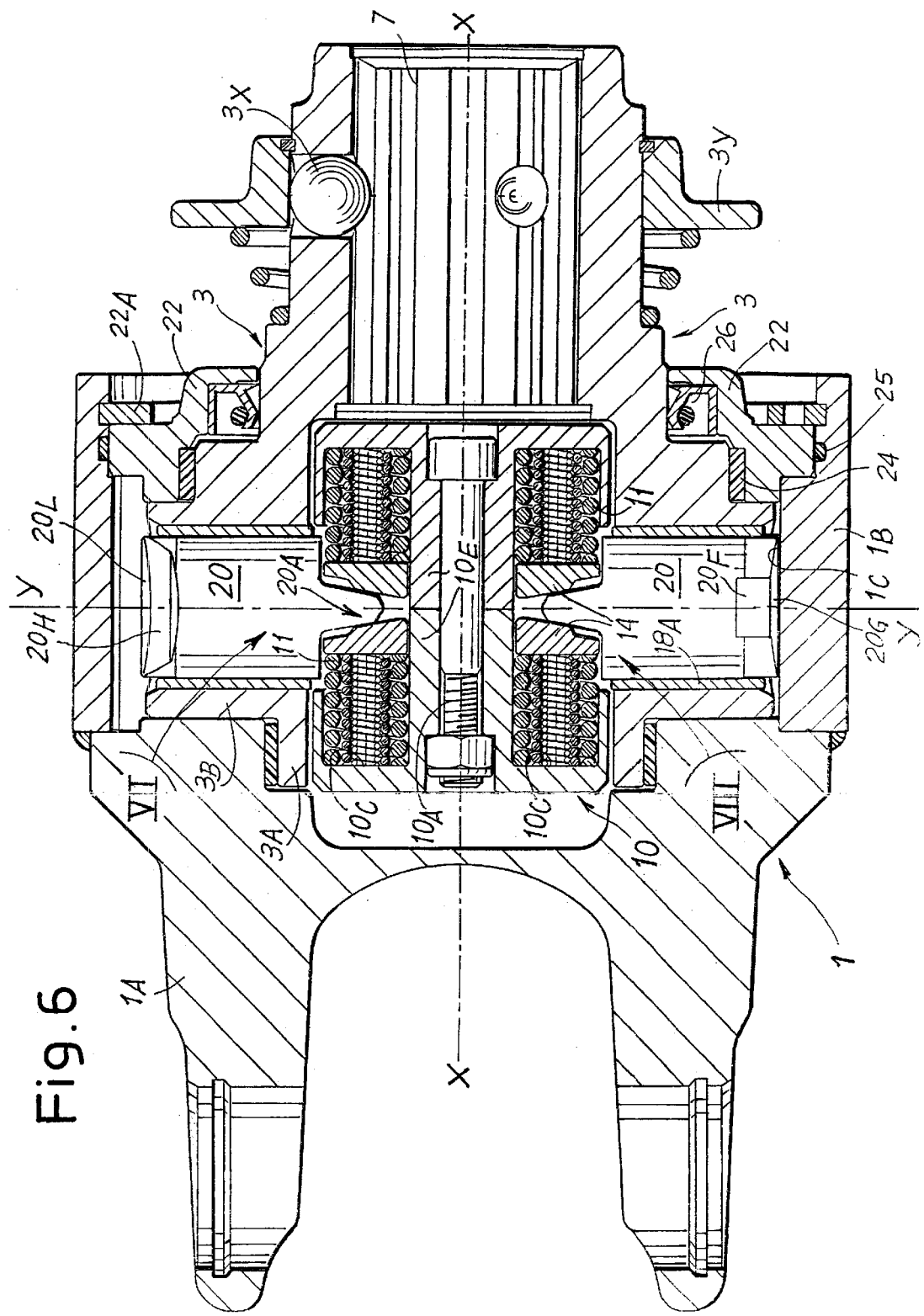
FIG. 6 is a section through an axial plane which shows one of the states of disengagement between the two members, the driving and driven members.
Figure 7:
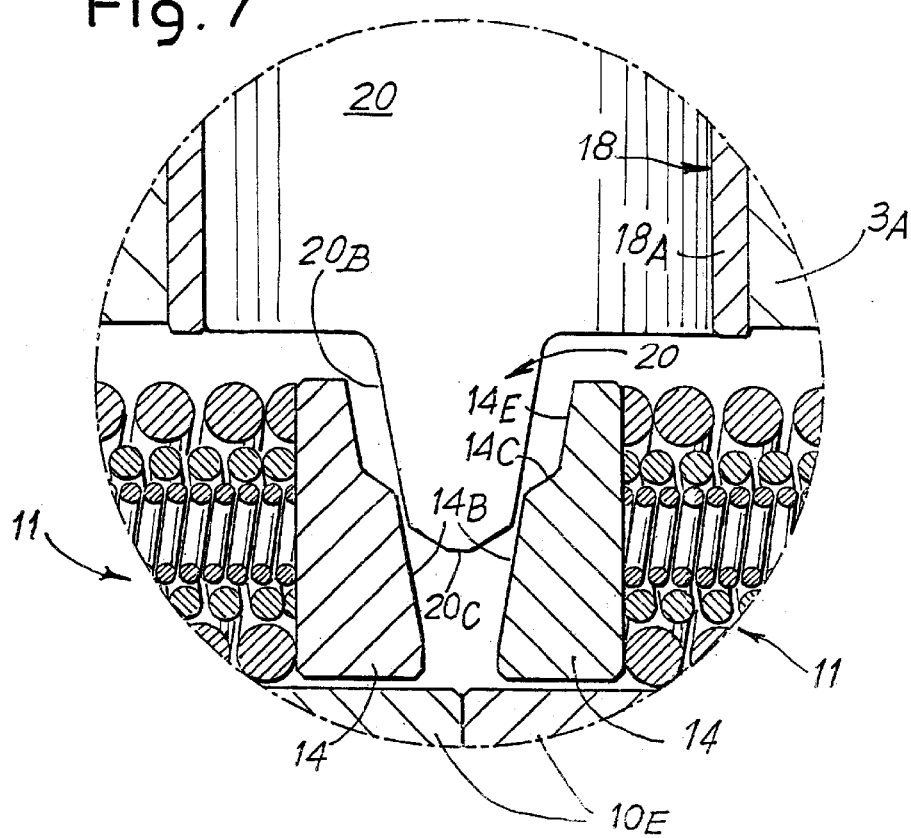
FIGS. 7 and 8 show enlarged details of the zones indicated by the arrows VII and VIII in FIG. 6.
Figure 8:
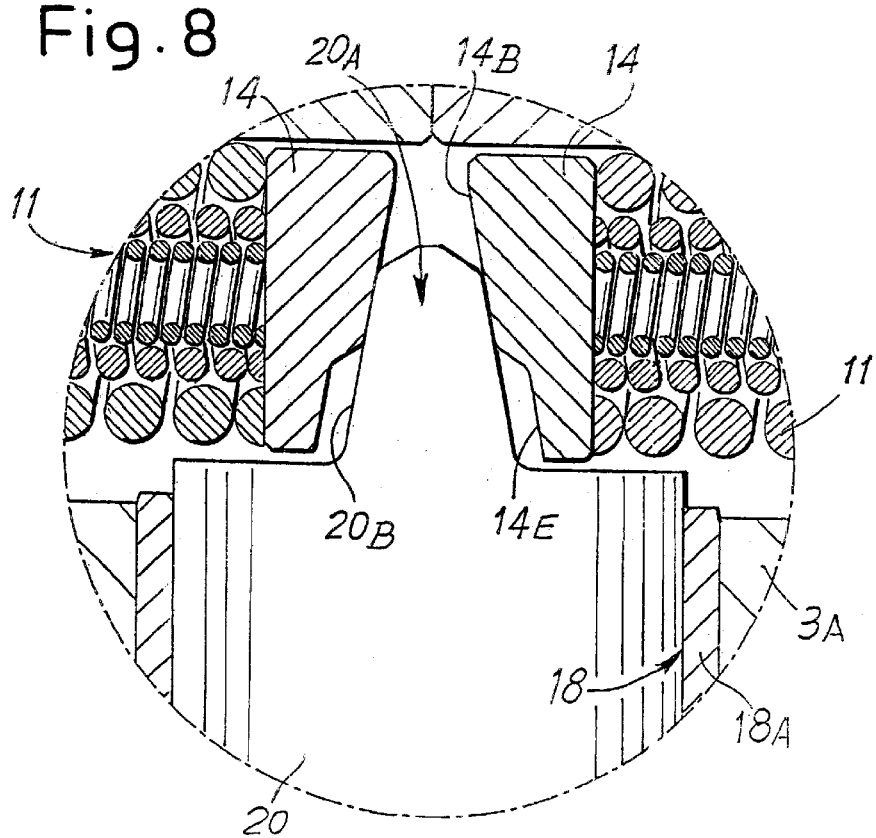

The core 3A of the inner member 3 is held by a shaped annular cover 22 (FIGS. 1, 6, etc.) applied to the end of the cavity defined by the skirt 1B by means of an elastic ring 22A. Annular bearings 23, 24 are provided between the two members 1 and 3; suitable leaktight linings such as 25 and 26 will also be provided to ensure lubrication inside the cavity defined by the skirt 1B, for the operability of the components of the above described joint and the operation of which is described hereinbelow; the supply of lubricant will be ensured by suitable lubricators.

In the torque transmission position, the various elements of the joint or coupling are arranged as shown in FIGS. 1, 2, 11 and 12. The with each other and the surfaces 14E are in contact with the surfaces 20B.

Figure 9:
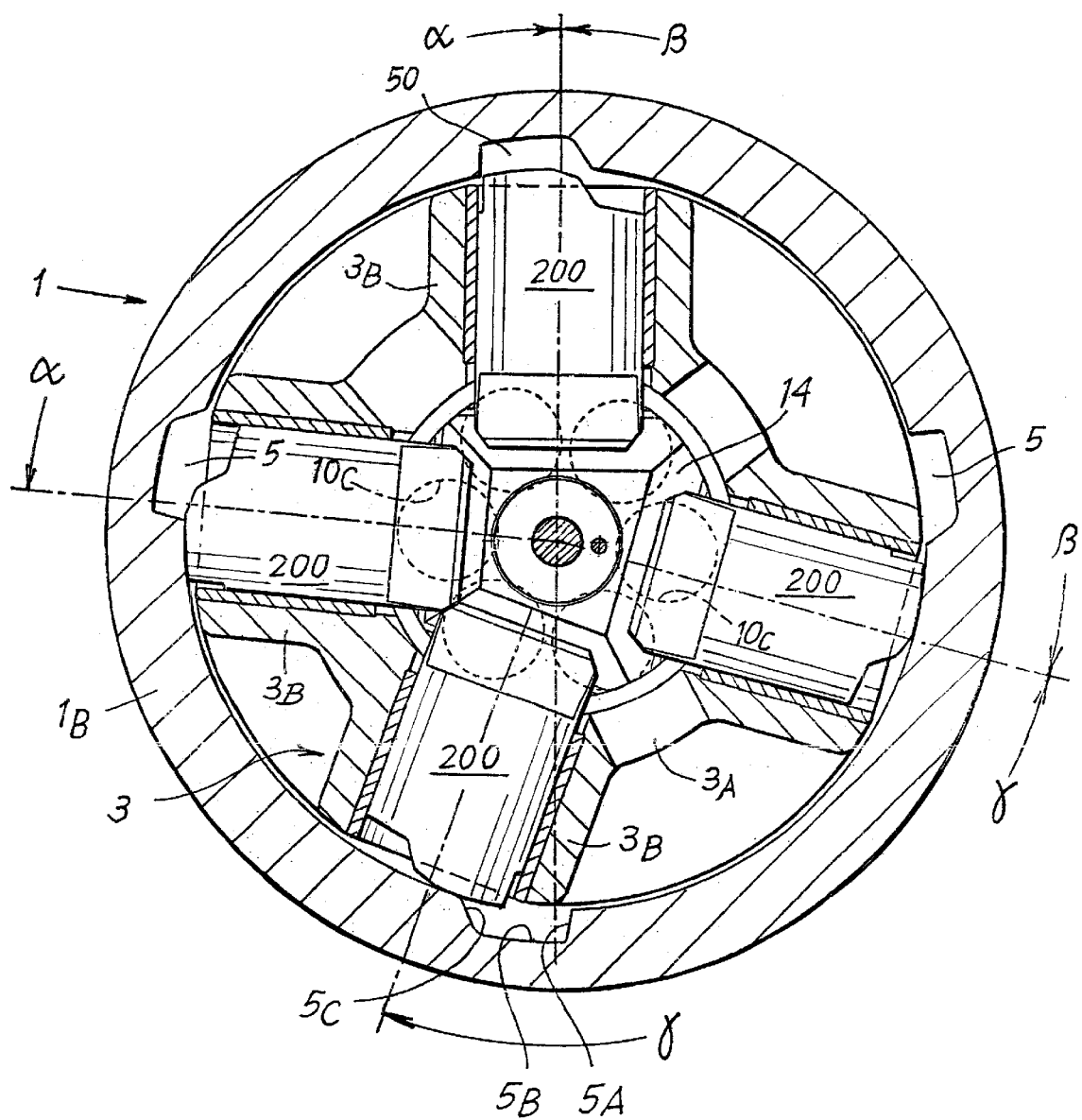
FIGS. 9 and 10 are sections analogous to that in FIG. 2, showing states of disengagement between driving and driven members.
Figure 10:
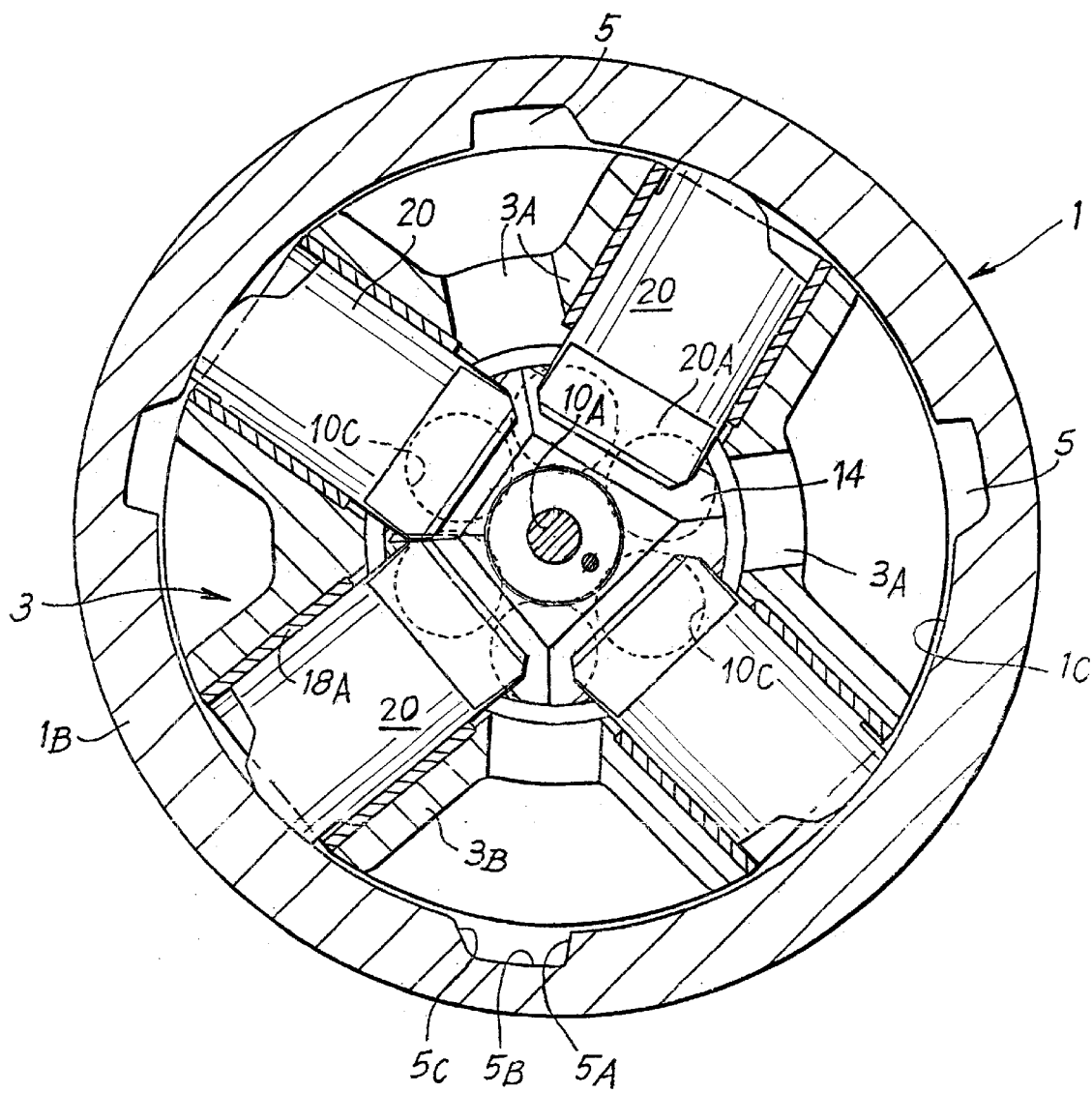

Coupling between the two members 1 and 3 takes place exclusively in one reciprocal angular position of the two members, when each specific slider 20 penetrates into its corresponding recess 5. The differing reciprocal angular distances between the sliders 20 and between the recesses 5 prevent a slider 20 from engaging with any other recess 5 other than that relevant to said slider in question. Specifically, until the two members 1 and 3 are in the angular position in which each slider 20 has its own corresponding recess 5 (as a result of which the four sliders 20 penetrate into their respective four recesses 5), the state shown in FIGS. 6 and 9 arises, in which a slider "200" could penetrate with centrifugal movement into a housing "50" (which is not allocated to said slider "200"); but the other three sliders 200X are prevented from moving centrifugally, since no recess 5 corresponds to them; therefore this obstruction caused by the sliders 200X prevents any action of the springs 11 on the discoidal elements 14, which are kept spaced apart (FIG. 9) by the wedge-shaped profiles 20A of two or three sliders "200X"; the slider "200", which could penetrate into the recess "50", is not stressed by any elastic force exerted by the springs 11 (which cannot move the discoidal elements 14 into contact); thus the slider "200" is not stressed otherwise than by any possible, very slight centrifugal inertia, and it is in any case readily pushed back toward the inside of the surfaces 5C, 5E, without any appreciable twisting and without wear. The states shown in FIGS. 9 and 10 are thus retained until the unique reciprocal coupling position is reached (FIGS. 1, 2, 11 and 12) in which each slider 20 penetrates into its own associated recess 5.

In the abovementioned coupling conditions (FIGS. 1, 2 and 11), all the sliders 20 find a housing in their corresponding recesses 5. Therefore, for each slider, the flanks 20F and 20H are substantially in contact with the flanks 5A and 5C, the end surface 20B is opposite the bottom 5B, the wedge-shaped surfaces 20B correspond to the surfaces 14E of the discoidal elements 14 in mutual contact. Transmission occurs through the thrust between the surfaces 5C and 20H, from the driving member to the driven member (which may be either the inner or the outer member).

When the resisting torque, which is overcome by the torque transmitted as stated above, exceeds a certain value, a thrust is generated between the inclined surfaces 20H and 5C, as a result of which a thrust in the centripetal direction is generated on the sliders 20 and the wedges constituted by the surfaces 20B of the end 20A of the sliders 20 stress the two discoidal elements 14 in a direction such as to move them apart against the action of the respective antagonist springs 11. Thus, when the resisting torque reaches and exceeds the predetermined limit, the centripetal thrust on the sliders 20 is such that it overcomes the elastic reaction of the springs 11, causing the discoidal elements 14 to move apart until, from the position shown in FIGS. 1, 2, 11 and 12, they reach the position shown in FIGS. 6, 7, 8, 9 and 10, in which wedges 20A of the sliders 20, with a centripetal movement, are caused to penetrate between the discoidal elements 14, causing them to move apart until the wedge-shaped surfaces 20B bear against the surfaces 14B (FIG. 7); in these conditions, the end surfaces 20G of the sliders 20 are in alignment with the inner surface 1C of the skirt 1B of the outer member 1 and the angular coupling between the two members 1 and 3 ceases, and hence it is possible to have relative angular gliding between the two members 1 and 3, as shown in FIGS. 9 and 10. Disengagement is thereby obtained between the two members of the joint or coupling and a relative and relatively very fast rotation, as a result of which the sliders 20 do not tend to penetrate again into the recesses 5 which are in correspondence with said sliders, until such time as the relative velocity is substantially reduced. The tendency of the sliders 20 to penetrate into the recesses 5 is determined by the centrifugal components which the surfaces 14B exert on the sliders 20 through the effect of the elastic thrusting of the springs 11, across the contacting surfaces 14B and 20B. While a high relative velocity is maintained between the two members 1 and 3, when a slider 20 passes in front of a recess 5 there is at most a slight impact (FIG. 12) between the surface of the junction 20L and the surface of the junction 5E, and hence the slider 20 does not have time to penetrate into the recess 5 and continues its movement, passing over said recess 5; this takes place each time for a single slider 20 while the other three continue to be held by the surface 1C, and said single slider 20 is not stressed in the centrifugal direction by the springs 11, because the wedges 20A of the other three sliders 20 keep the two discoidal elements 14 mutually parted, as a result of which no centrifugal stressing is imposed on the slider which is passing in front of a recess 5. Only on passing into the unique relative position of possible coupling can the four sliders 20 be stressed toward their respective recesses 5. The passing of the recesses 5 by the sliders 20, without coupling taking place, occurs until such time as the relative tangential velocity between the two members 1 and 3 is reduced to a point such that the centrifugal thrust exerted by the springs 11 through the discoidal elements 14 on the sliders 20 again causes the simultaneous penetration of all the sliders into their respective recesses 5, to return from the position shown in FIGS. 6, 9 and 10 to the position shown in FIGS. 1, 2, 11 and 12, in the unique relative angular position of coupling. The reduction of the relative velocity may also be such as to reach the condition of rest, or at least of near-equality, between the velocities of the two members. Particularly noteworthy operation of the torque-limiting coupling is thus obtained, for the purposes of the dynamic requirements sought or desired for these contrivances.

The combined effect of the differentiated angular distances between the recesses 5 and between the sliders 20 and of the presence of the discoidal elements 14 on which the springs act, brings the advantage of avoiding, or at least greatly reducing, twisting and wear on the cooperating surfaces of the recesses 5 and of the sliders 20 during the conditions in which disengagement between the two members persists. Specifically, on the one hand the occasions on which each slider 20 is pushed away in passing in front of a recess are reduced, and on the other hand the springs 22 act on the sliders 20 to stress them to penetrate into the recesses 5 only when the reciprocal anqular positioning between the members 1 and 3, in which coupling can occur, is reached.

By increasing the number of coupling units by comparison with the four indicated in the example, different dynamic effects can be obtained. Further possibilities of variation within the scope of the same morphology of the driving and driven members of the joint can be obtained by modifying the characteristics of the elastic thrusts of the springs 11, by substituting the springs with other springs, respectively, adding or taking away coaxial helical springs to or from the seats 10C. Variations in the characteristics of a joint can also be obtained by varying the inclination of the flanks 5C and 20H respectively, by varying the inclinations of the surfaces 14B and 14E and of the surfaces 20B. Other possible variations are obtained with an arrangement envisaged in simultaneous European Patent Application No. 1072810 dated Jan. 31, 2001 in the name of the same proprietor.

It is understood that the drawing shows only an example, given solely by way of a practical demonstration of the invention, said invention being capable of variation in shapes and arrangements without thereby departing from the scope of the concept underlying said invention. The presence of any reference numbers in the appended claims serves the purpose of facilitating reading of the claims with reference to the description and the drawing, and does not limit the scope of protection represented by the claims.

I claim:

1. A transmission and torque-limiting joint able to disengage a driven member from a driving member upon exceeding a maximum value of transmitted torque and to allow recoupling, one of the two members being outer and the other inner, comprising:

on the inner surface of said outer member, receptive recesses, developed parallel to the axis of rotation; in the inner member, substantially radial glide seats equal in number to said receptive recesses; in each of said substantially radial glide seats, a slider, able to glide radially and stressed by elastic means in the centrifugal direction, and with an outer profile which is shaped and able to penetrate into one of said receptive recesses of the outer member to transmit a torque between said two members, inner and outer, and generate centripetal radial thrusts on the slider; said joint comprising said substantially radial glide seats in the inner member disposed at mutually different angles and said recesses being correspondingly arranged in the outer member; and in that the elastic means able to stress said sliders in the centrifugal direction comprise two symmetrical discoidal elements on whose facing surfaces shaped portions are tangentially machined which are able to cooperate with corresponding inner profiles of said sliders, springs being provided capable of urging said two discoidal elements toward one another, as a result of which said discoidal elements remain spaced apart from one another by the inner profiles of at least two of said sliders and are elastically brought into contact with one another only when the two members, one being the driving and the other the driven member of the joint, are located in the unique reciprocal angular position in which one respective single recess corresponds to each slider.

2. Joint as claimed in claim 1, characterized in that the cooperating surfaces of said sliders and of said discoidal elements are planar surfaces inclined in the manner of a wedge toward the inner ends of the sliders, and corresponding dual planar surfaces, likewise inclined with a connection in the discoidal elements, have different orientations relative to the different angular distances between the seats for the sliders in the inner member and between the recesses in the outer member.

3. Joint is claimed in claim 1, characterized in that an axial seat is machined in the inner member and accommodates two opposed reaction elements which are coupled and form axial extensions on which the two said discoidal elements can move, possessing central holes, and said two reaction elements forming seats for springs acting on the two discoidal elements to stress them against one another.

4. Joint as claimed in claim 3, characterized in that the said reaction elements are coupled by a central bolt through their axial extensions.

5. Joint as claimed in claim 1, characterized in that the recesses in the outer member and the sliders are four in number and are angularly spaced at mutually different angles.

6. A transmission joint comprising:

a first shaft having an inner circumferential surface defining a plurality of recesses circumferentially spaced at mutually different angles;

a second shaft having an end arranged opposite said surface of said first shaft, said end of said second shaft defining a plurality of glide seats corresponding to said recesses of said surface of said first shaft;

a plurality of sliders, each of said sliders being radially slidable in one of said glide seats and said recesses;

two symmetrical discoidal elements arranged on said second shaft and having facing surfaces biased into substantially simultaneous contact with opposite sides of each of said sliders, said shape of said facing surfaces of said two discoidal elements and said sliders having a shape to have bias force from said discoidal elements substantially simultaneously recess bias all of said sliders toward said recesses, said discoidal elements and said sliders also being formed to have a blocked movement of any one slider blocking said recess bias on all remaining said sliders.

\* \* \* \* \*